(12) United States Patent
Kotani et al.

(10) Patent No.: US 11,929,245 B2
(45) Date of Patent: Mar. 12, 2024

(54) SAMPLE SUPPORT, METHOD FOR PRODUCING SAMPLE SUPPORT, IONIZATION METHOD AND MASS SPECTROMETRY METHOD

(71) Applicant: HAMAMATSU PHOTONICS K.K., Hamamatsu (JP)

(72) Inventors: Masahiro Kotani, Hamamatsu (JP); Takayuki Ohmura, Hamamatsu (JP); Akira Tashiro, Hamamatsu (JP)

(73) Assignee: HAMAMATSU PHOTONICS K.K., Hamamatsu (JP)

(*) Notice: Subject to any disclaimer, the term of this patent is extended or adjusted under 35 U.S.C. 154(b) by 358 days.

(21) Appl. No.: 17/439,431

(22) PCT Filed: Jan. 23, 2020

(86) PCT No.: PCT/JP2020/002385
§ 371 (c)(1),
(2) Date: Sep. 15, 2021

(87) PCT Pub. No.: WO2020/189005
PCT Pub. Date: Sep. 24, 2020

(65) Prior Publication Data
US 2022/0199387 A1 Jun. 23, 2022

(30) Foreign Application Priority Data
Mar. 20, 2019 (JP) ................ 2019-052693

(51) Int. Cl.
*H01J 49/04* (2006.01)
(52) U.S. Cl.
CPC .............. *H01J 49/0418* (2013.01)

(58) Field of Classification Search
CPC ................................................ H01J 49/0418
(Continued)

(56) References Cited

U.S. PATENT DOCUMENTS

| 7,695,978 B2 | 4/2010 | Laprade et al. |
| 11,101,124 B2 | 8/2021 | Kotani et al. |

(Continued)

FOREIGN PATENT DOCUMENTS

| EP | 3 214 436 A1 | 9/2017 |
| EP | 3 214 437 A1 | 9/2017 |

(Continued)

OTHER PUBLICATIONS

International Preliminary Report on Patentability dated Sep. 30, 2021 for PCT/JP2020/002385.

(Continued)

*Primary Examiner* — Nicole M Ippolito
(74) *Attorney, Agent, or Firm* — Faegre Drinker Biddle & Reath LLP

(57) ABSTRACT

A sample support body for ionization of a sample, including: a substrate having a first surface, a second surface on a side opposite to the first surface, and a plurality of through-holes opening on each of the first surface and the second surface; a conductive layer provided on the first surface; and a matrix crystal layer provided on at least one of the conductive layer and the second surface, in which the matrix crystal layer is formed of a plurality of matrix crystal grains so as to include a gap communicating the plurality of through-holes with an outside.

10 Claims, 10 Drawing Sheets

(58) Field of Classification Search
USPC .................................... 250/281, 282, 288
See application file for complete search history.

(56) References Cited

U.S. PATENT DOCUMENTS

| | | |
|---|---|---|
| 2002/0094533 A1 | 7/2002 | Hess et al. |
| 2005/0133714 A1 | 6/2005 | Vestal et al. |
| 2008/0078931 A1 | 4/2008 | Vestal et al. |
| 2008/0138845 A1* | 6/2008 | Shin .................. G01N 33/6851 435/23 |
| 2013/0099112 A1* | 4/2013 | Haase .................. H01J 49/164 250/288 |
| 2020/0266043 A1 | 8/2020 | Naito et al. |
| 2020/0273689 A1 | 8/2020 | Naito et al. |
| 2020/0346232 A1* | 11/2020 | Terashima ............. B05B 12/12 |

FOREIGN PATENT DOCUMENTS

| | | |
|---|---|---|
| EP | 3686586 A1 | 7/2020 |
| JP | 2007-309860 A | 11/2007 |
| JP | 2007-327910 A | 12/2007 |
| JP | 2009-002704 A | 1/2009 |
| JP | 2009-080106 A | 4/2009 |
| JP | 2014-021048 A | 2/2014 |
| JP | 2018-155742 A | 10/2018 |
| JP | 2019-056639 A | 4/2019 |
| WO | WO-2017/038709 A1 | 3/2017 |
| WO | WO-2018/163956 A1 | 9/2018 |
| WO | WO-2019/058790 A1 | 3/2019 |

OTHER PUBLICATIONS

International Preliminary Report on Patentability dated Apr. 2, 2020 for PCT/JP2018/029447.

* cited by examiner

Fig.4
(a)
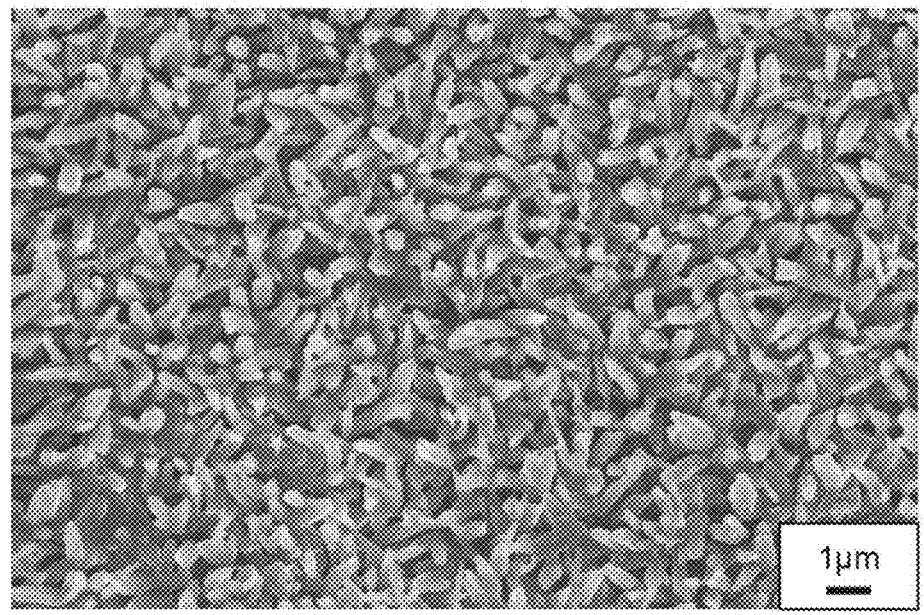
(b)
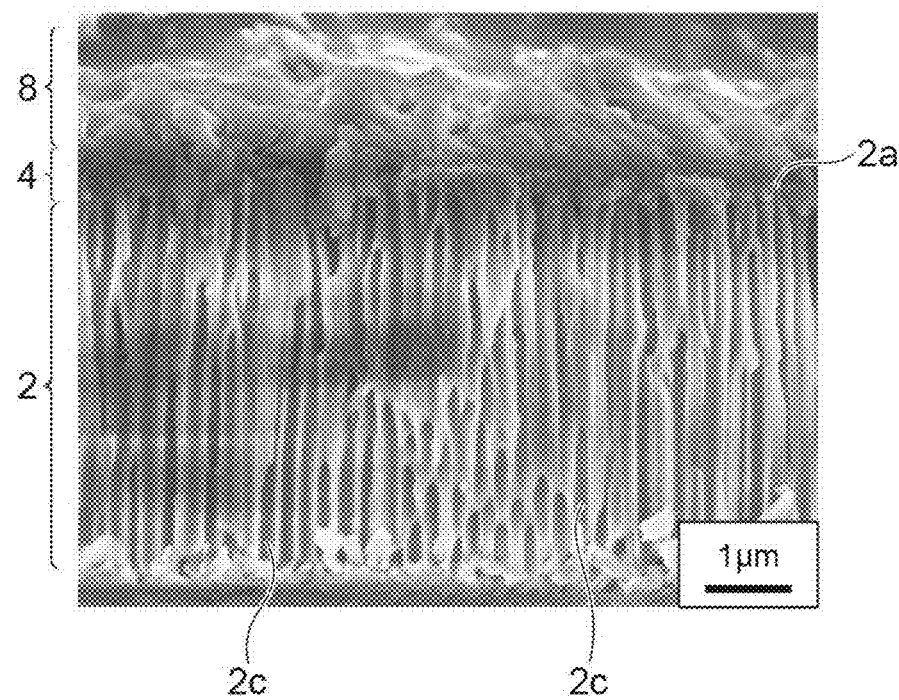

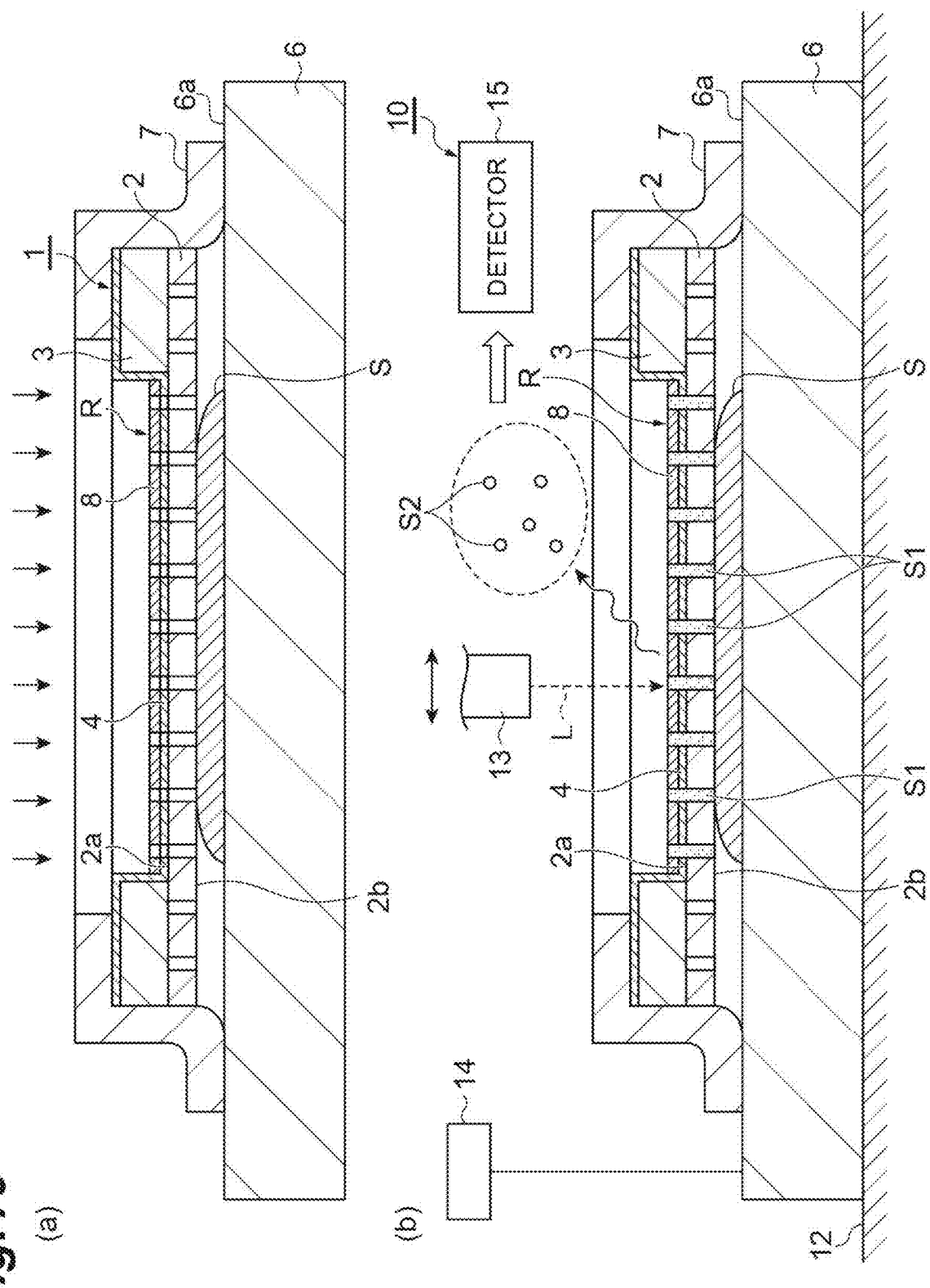

SAMPLE SUPPORT, METHOD FOR PRODUCING SAMPLE SUPPORT, IONIZATION METHOD AND MASS SPECTROMETRY METHOD

TECHNICAL FIELD

The present disclosure relates to a sample support body, a method for manufacturing a sample support body, an ionization method, and a mass spectrometry method.

BACKGROUND ART

In the related art, as a method of ionizing a sample such as a biological sample for performing mass spectrometry or the like, there is known a matrix-assisted laser desorption/ionization method (MALDI). The MALDI is a method of ionizing a sample by adding an organic compound having a low molecular weight called a matrix that absorbs a laser beam to the sample and irradiating the sample with the laser beam. According to the method, it is possible to nondestructively ionize substances being thermally unstable and high-molecular-weight substances (so-called soft ionization).

CITATION LIST

Patent Literature

Patent Literature 1: U.S. Pat. No. 7,695,978

SUMMARY OF INVENTION

Technical Problem

However, when the MALDI as described above is used for the imaging mass spectrometry that forms an image from the two-dimensional distribution of the molecules constituting the sample, there is a limit in increasing resolution of the image.

Therefore, an object of the present disclosure is to provide a sample support body, a method for manufacturing a sample support body, an ionization method, and a mass spectrometry method that make it possible to improve resolution of an image in ionization and imaging mass spectrometry for components of a sample having a high molecular weight.

Solution to Problem

A sample support body of one aspect of the present disclosure is a sample support body for ionization of a sample, including: a substrate having a first surface, a second surface on a side opposite to the first surface, and a plurality of through-holes opening on each of the first surface and the second surface; a conductive layer provided on the first surface; and a matrix crystal layer provided on at least one of the conductive layer and the second surface, in which the matrix crystal layer is formed of a plurality of matrix crystal grains so as to include a gap communicating the plurality of through-holes with an outside.

In the sample support body, for example, when the sample support body is arranged on a water-containing sample so that the second surface of the substrate is in contact with the water-containing sample, since the matrix crystal layer includes a gap communicating the plurality of through-holes with an outside, the components of the sample move from the second surface side to the first surface side via the plurality of through-holes due to a capillary phenomenon and are mixed with the matrix. In this state, for example, when the first surface is irradiated with an energy beam while a voltage is applied to the conductive layer, the energy is transferred to the components of the sample and the matrix that have moved to the first surface side, and the components of the sample are ionized together with the matrix. Accordingly, it is possible to surely ionize the components of the sample having a high molecular weight. At this time, since the components of the sample move from the second surface side to the first surface side via the plurality of through-holes, the position information (two-dimensional distribution information of the molecules constituting the sample) of the sample is maintained in the components of the sample that have moved to the first surface side of the substrate. In this state, for example, since the first surface is irradiated with the energy beams while the voltage is applied to the conductive layer, the components of the sample are ionized while the position information of the sample is maintained. Accordingly, it is possible to improve the resolution of the image in the imaging mass spectrometry. Thus, the sample support body makes it possible to improve the resolution of the image in the ionization and the imaging mass spectrometry for the sample having a high molecular weight.

In the sample support body of one aspect of the present disclosure, a width of each of the plurality of through-holes may be 1 to 700 nm, and a thickness of the substrate may be 1 to 50 μm. Accordingly, it is possible to allow the components of the sample to smoothly move from the second surface side to the first surface side via the plurality of through-holes, and it is possible to allow the components of the sample to stay on the first surface side in an appropriate state.

In the sample support body of one aspect of the present disclosure, the substrate may be formed by anodizing a valve metal or silicon. Accordingly, it is possible to easily and surely obtain a substrate having a plurality of through-holes.

A sample support body of one aspect of the present disclosure is a sample support body for ionization of a sample, including: a conductive substrate having a first surface, a second surface on a side opposite to the first surface, and a plurality of through-holes opening on each of the first surface and the second surface; and a matrix crystal layer provided on at least one of the first surface and the second surface, in which the matrix crystal layer is formed with a plurality of matrix crystal grains so as to include a gap communicating the plurality of through-holes with an outside.

According to the sample support body, the conductive layer can be omitted, and the same effect as that of the sample support body provided with the conductive layer described above can be obtained.

A method for manufacturing a sample support body according to one aspect of the present disclosure is a method for manufacturing a sample support body for ionization of a sample, including: a process of preparing a substrate having a first surface, a second surface on a side opposite to the first surface, and a plurality of through-holes opening on each of the first surface and the second surface and being provided with a conductive layer on the first surface; and a process of providing a matrix crystal layer on at least one of the conductive layer and the second surface by evaporation of a matrix material, in which, in the process of providing the matrix crystal layer, the matrix crystal layer is formed with a plurality of matrix crystal grains so as to include a gap communicating the plurality of through-holes with an outside.

A method for manufacturing a sample support body according to one aspect of the present disclosure is a method for manufacturing a sample support body for ionization of a sample, including: a process of preparing a conductive substrate having a first surface, a second surface on a side opposite to the first surface, and a plurality of through-holes opening on each of the first surface and the second surface; and a process of providing a matrix crystal layer on at least one of the first surface and the second surface by evaporation of a matrix material, in which, in the process of providing the matrix crystal layer, the matrix crystal layer is formed with a plurality of matrix crystal grains so as to include a gap communicating the plurality of through-holes with an outside.

According to these methods for manufacturing the sample support body, it is possible to easily and surely obtain the matrix crystal layer as described above by performing the evaporation of a matrix material.

An ionization method of one aspect of the present disclosure includes: a process of preparing a substrate having a first surface, a second surface on a side opposite to the first surface, and a plurality of through-holes opening on each of the first surface and the second surface and being provided with a conductive layer on the first surface; a process of arranging a sample on a mount portion and arranging the substrate on the sample so that the second surface is in contact with the sample; a process of providing a matrix crystal layer on the conductive layer by evaporation of a matrix material; and a process of ionizing components of the sample having moved from the second surface side to the first surface side via the plurality of through-holes together with the matrix by irradiating the first surface with an energy beam while applying a voltage to the conductive layer in a state where the sample is arranged between the mount portion and the substrate, in which, in the process of providing the matrix crystal layer, the matrix crystal layer is formed with a plurality of matrix crystal grains so as to include a gap communicating the plurality of through-holes with an outside.

An ionization method of one aspect of the present disclosure includes: a process of preparing a conductive substrate having a first surface, a second surface on a side opposite to the first surface, and a plurality of through-holes opening on each of the first surface and the second surface; a process of arranging a sample on a mount portion and arranging the substrate on the sample so that the second surface is in contact with the sample; a process of providing a matrix crystal layer on the first surface by evaporation of a matrix material; and a process of ionizing components of the sample having moved from the second surface side to the first surface side via the plurality of through-holes together with the matrix by irradiating the first surface with an energy beam while applying a voltage to the substrate in a state where the sample is arranged between the mount portion and the substrate, in which, in the process of providing the matrix crystal layer, the matrix crystal layer is formed with a plurality of matrix crystal grains so as to include a gap communicating the plurality of through-holes with an outside.

According to these ionization methods, the matrix crystal layer as described above can be easily and surely obtained by performing the evaporation of a matrix material. Thus, these ionization methods make it possible to improve the resolution of the image in the ionization and the imaging mass spectrometry for the components of the sample having a high molecular weight.

A mass spectrometry method of one aspect of the present disclosure includes the processes provided by the above ionization method and a process of detecting the ionized components.

As described above, the mass spectrometry method makes it possible to improve the resolution of the image in the ionization and the imaging mass spectrometry for the components of the sample having a high molecular weight.

Advantageous Effects of Invention

According to the present disclosure, it is possible to provide a sample support body, a method for manufacturing a sample support body, an ionization method, and a mass spectrometry method, that make it possible to improve resolution of an image in ionization and imaging mass spectrometry for components of a sample having a high molecular weight.

BRIEF DESCRIPTION OF DRAWINGS

FIG. 4 is a view illustrating an example of an SEM image of a portion of a surface of a matrix crystal layer illustrated in FIG. 1 and an example of an SEM image of a portion of a cross section of the matrix crystal layer.

FIG. 10 is a view illustrating a process of a mass spectrometry method using the sample support body of Modified Example.

DESCRIPTION OF EMBODIMENTS

Hereinafter, embodiments of the present disclosure will be described in detail with reference to the drawings. It is noted that the same or equivalent portions are denoted by the same reference signs in each of the drawings, and duplicate descriptions thereof will be omitted.

Figure 1:
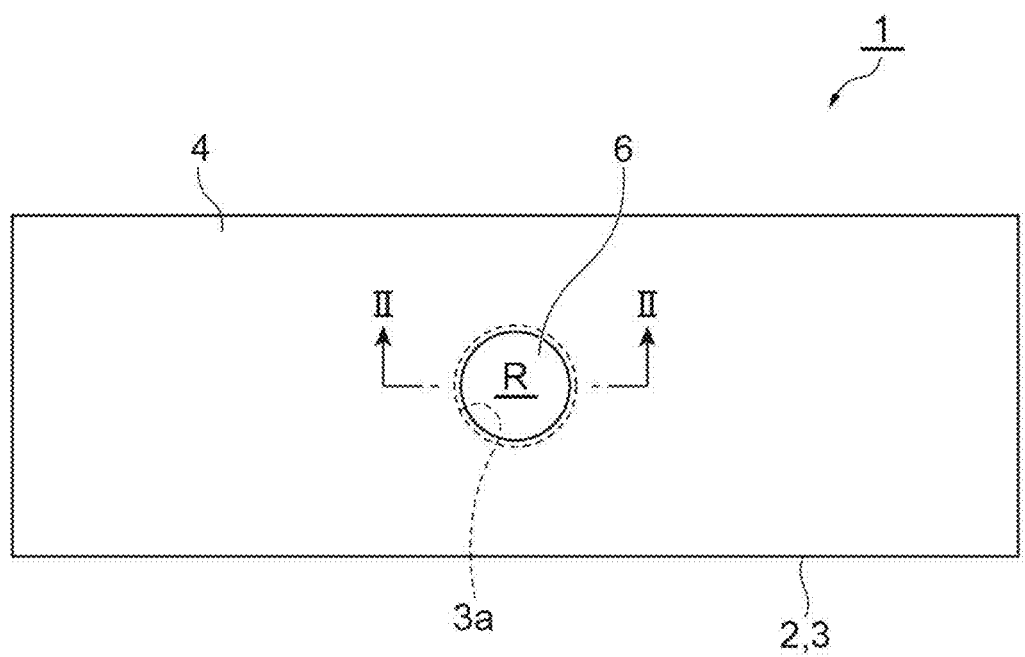
FIG. 1 is a plan view of a sample support body of one embodiment.
Figure 2:
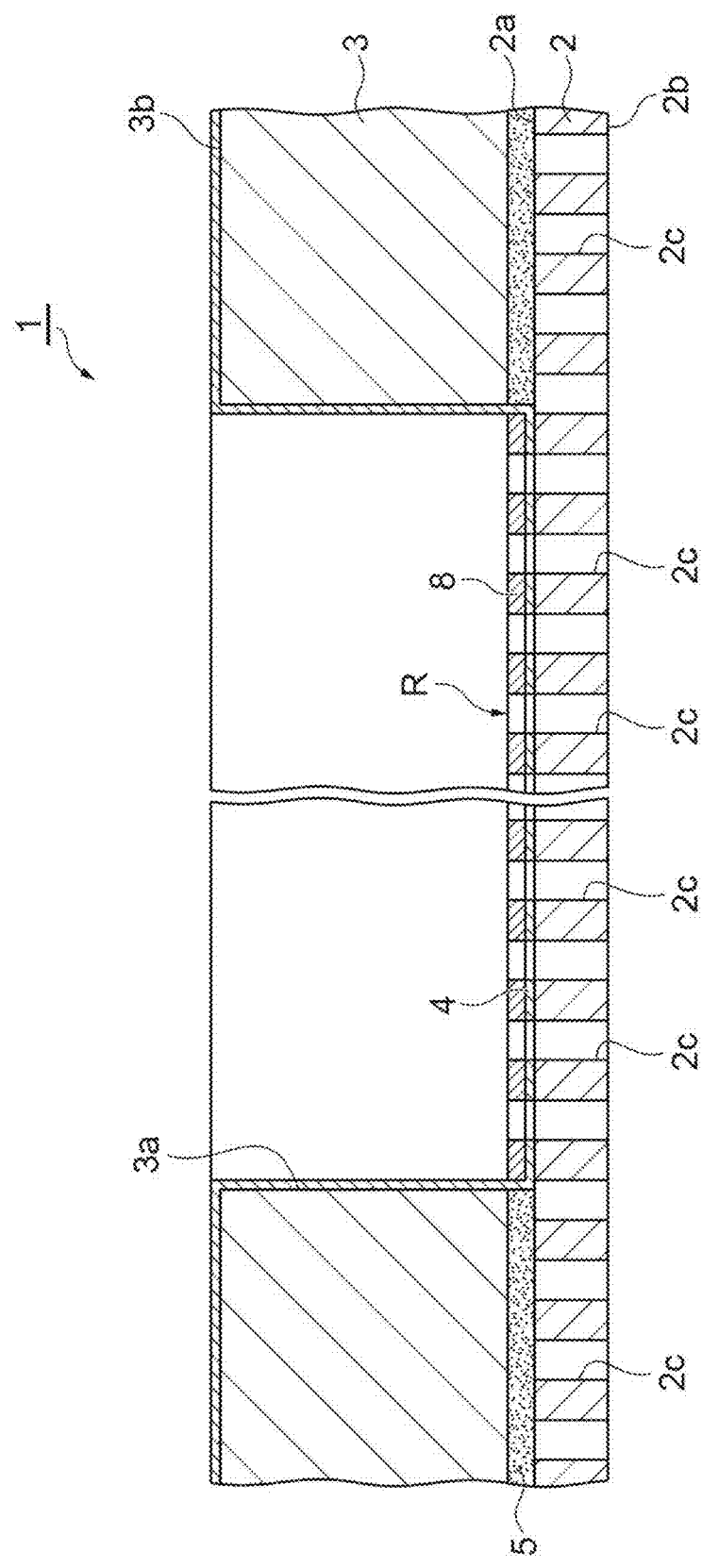
FIG. 2 is a cross-sectional view taken along line II-II illustrated in FIG. 1.

As illustrated in FIGS. 1 and 2, a sample support body 1 for ionization of a sample includes a substrate 2, a frame 3, a conductive layer 4, and a matrix crystal layer 8. The substrate 2 has a first surface 2*a*, a second surface 2*b*, and a plurality of through-holes 2*c*. The second surface 2*b* is a surface on a side opposite to the first surface 2*a*. The plurality of through-holes 2*c* extend along a thickness direction (direction perpendicular to the first surface 2*a* and the second surface 2*b*) of the substrate 2 and open on each of the first surface 2*a* and the second surface 2*b*. In the present embodiment, the plurality of through-holes 2c are formed uniformly (in a uniform distribution) on the substrate 2.

The substrate 2 is formed in a rectangular plate shape with, for example, an insulating material. The length of one side of the substrate 2 when viewed from the thickness direction of the substrate 2 is, for example, about several cm, and the thickness of the substrate 2 is, for example, 1 to 50 μm. The shape of the through-hole 2c when viewed from the thickness direction of the substrate 2 is, for example, a substantially circular shape. The width of the through-hole 2c is, for example, 1 to 700 nm.

Figure 3:
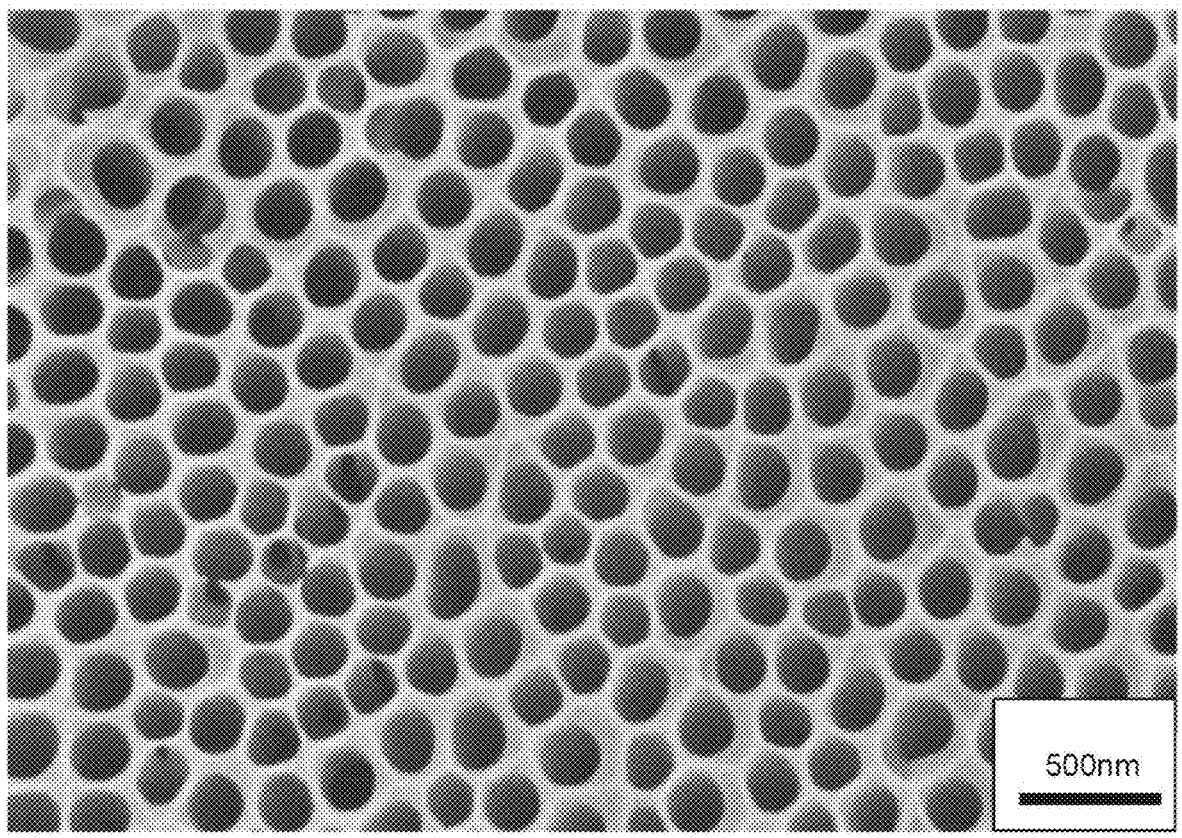
FIG. 3 is a view illustrating an example of an SEM image of a portion of a first surface of a substrate illustrated in FIG. 1.

The width of the through-hole 2c is a value obtained as follows. First, the images of the first surface 2a and the second surface 2b of the substrate 2 are acquired. FIG. 3 illustrates an example of an SEM image of a portion of the first surface 2a of the substrate 2. In the SEM image, the black portion is the through-hole 2c, and the white portion is a partition wall portion between the through-holes 2c. Subsequently, by performing, for example, binarization processing on the acquired image of the first surface 2a, a plurality of pixel groups corresponding to the plurality of first openings (openings on the first surface 2a side of the through-hole 2c) in a measurement region R are extracted, and the diameter of a circle having an average area of the first opening is obtained based on the size per pixel. Similarly, by performing, for example, binarization processing on the acquired image of the second surface 2b, a plurality of pixel groups corresponding to the plurality of second openings (openings on the second surface 2b side of the through-hole 2c) in the measurement region R are extracted, and the diameter of a circle having an average area of the second opening is obtained based on the size per pixel. Then, the average value of the diameter of the circle acquired for the first surface 2a and the diameter of the circle acquired for the second surface 2b is acquired as the width of the through-hole 2c.

As illustrated in FIG. 3, the plurality of through-holes 2c having a substantially constant width are uniformly formed on the substrate 2. The aperture ratio (the ratio of all the through-holes 2c to the measurement region R when viewed from the thickness direction of the substrate 2) of the through-holes 2c in the measurement region R is practically 10 to 80%, and in particular, is preferably 60 to 80%. The sizes of the plurality of through-holes 2c may be irregular to each other, or the plurality of through-holes 2c may be partially connected to each other.

The substrate 2 illustrated in FIG. 3 is an alumina porous film formed by anodizing aluminum (Al). Specifically, the substrate 2 can be obtained by performing anodizing treatment on the Al substrate and peeling the oxidized surface portion from the Al substrate. It is noted that the substrate 2 may be formed by anodizing a valve metal other than Al such as tantalum (Ta), niobium (Nb), titanium (Ti), hafnium (Hf), zirconium (Zr), zinc (Zn), tungsten (W), bismuth (Bi), or antimony (Sb) or may be formed by anodizing silicon (Si).

As illustrated in FIGS. 1 and 2, the frame 3 is provided on the first surface 2a of the substrate 2. Specifically, the frame 3 is fixed to the first surface 2a of the substrate 2 by an adhesive layer 5. As the material of the adhesive layer 5, it is preferable to use an adhesive material (for example, low melting point glass, vacuum adhesive, or the like) having little discharge gas. The frame 3 has substantially the same outer shape as, for example, the substrate 2 when viewed from the thickness direction of the substrate 2. An opening 3a is formed in the frame 3. The portion of the substrate 2 corresponding to the opening 3a functions as the measurement region R for moving the components of the sample from the second surface 2b side to the first surface 2a side via the plurality of through-holes 2c.

The frame 3 is formed in a rectangular plate shape with, for example, an insulating material. The length of one side of the frame 3 when viewed from the thickness direction of the substrate 2 is, for example, about several cm, and the thickness of the frame 3 is, for example, 1 mm or less. The shape of the opening 3a when viewed from the thickness direction of the substrate 2 is, for example, a circular shape, and the diameter of the opening 3a in this case is, for example, about several mm to several tens of mm. Such a frame 3 facilitates the handling of the sample support body 1 and suppresses the deformation of the substrate 2 caused by a temperature change or the like.

The conductive layer 4 is provided on the first surface 2a of the substrate 2. Specifically, the conductive layer 4 is formed continuously (integrally) on a region of the first surface 2a of the substrate 2 corresponding to the opening 3a of the frame 3 (that is, a region corresponding to the measurement region R), on the inner surface of the opening 3a, and on a surface 3b on the side opposite to the substrate 2 in the frame 3. The conductive layer 4 covers the portion of the first surface 2a of the substrate 2 in which the through-hole 2c is not formed in the measurement region R. That is, in the measurement region R, each through-hole 2c is exposed to the opening 3a.

The conductive layer 4 is formed of a conductive material. However, as the material of the conductive layer 4, it is preferable to use a metal having a low affinity (reactivity) with the sample and a high conductivity for the reasons described below.

For example, if the conductive layer 4 is formed of a metal such as copper (Cu), which has a high affinity with a sample such as a protein, there is a concern that the sample is ionized in a state where Cu atoms are attached to the sample molecules in the process of ionizing the sample, and thus, the detection result in the mass analysis method shifts by the amount of the Cu atoms attached. Therefore, as the material of the conductive layer 4, it is preferable to use a metal having a low affinity with the sample.

On the other hand, a constant voltage is easily applied to a metal having higher conductivity in an easy and stable way. For this reason, when the conductive layer 4 is formed of a metal having a high conductivity, it is possible to uniformly apply a voltage to the first surface 2a of the substrate 2 in the measurement region R. Further, a metal having higher conductivity also shows a tendency to have higher thermal conductivity. For this reason, when the conductive layer 4 is formed of a metal having a high conductivity, the energy of the laser beam with which the substrate 2 is irradiated can be efficiently transferred to the sample via the conductive layer 4. Therefore, as the material of the conductive layer 4, it is preferable to use a metal having a high conductivity.

From the above viewpoint, as the material of the conductive layer 4, for example, gold (Au), platinum (Pt), or the like is preferably used. The conductive layer 4 is formed to have a thickness of about 1 nm to 350 nm by, for example, a plating method, an atomic layer deposition method (ALD), an evaporation method, a sputtering method, or the like. It is noted that, as the material of the conductive layer 4, for example, chromium (Cr), nickel (Ni), titanium (Ti) and the like may be used.

The matrix crystal layer 8 is provided on the conductive layer 4. Specifically, the matrix crystal layer 8 is formed on the conductive layer 4 provided on the first surface 2a of the substrate 2 in the opening 3a of the frame 3. (a) of FIG. 4 is an example of an SEM image of a portion of the surface of the matrix crystal layer 8, and (b) of FIG. 4 is a view illustrating an example of an SEM image of a portion of the cross section of the matrix crystal layer 8. As illustrated in (a) and (b) of FIG. 4, the matrix crystal layer 8 is formed with a plurality of matrix crystal grains so as to include a gap communicating the plurality of through-holes 2c with an outside (outside of the matrix crystal layer 8 on a side opposite to the plurality of through-holes 2c). The plurality of matrix crystal grains are uniformly distributed and stay in the vicinity of the opening on the first surface 2a side in each through-hole 2c (in the vicinity of the opening formed in the conductive layer 4 so as to correspond to the through-hole 2c) and do not completely close the opening. The matrix crystal grains are crystal grains formed of a matrix material, and the size of the crystal grain is, for example, 200 to 1000 nm. The matrix material is an organic compound that absorbs a laser beam, and for example, α-cyano-4-hydroxycinnamic acid (CHCA), 2,5-dihydroxybenzoic acid (DHB), 3,5-dimethoxy-4-hydroxycinnamic acid (sinapinic acid), trans-4-hydroxy-3-methoxycinnamic acid (ferulic acid), 3-hydroxypicolinic acid (HPA), 1,8-dihydroxy-9,10-dihydroanthracene-9-one (disilanol), and the like are exemplified.

Figure 5:
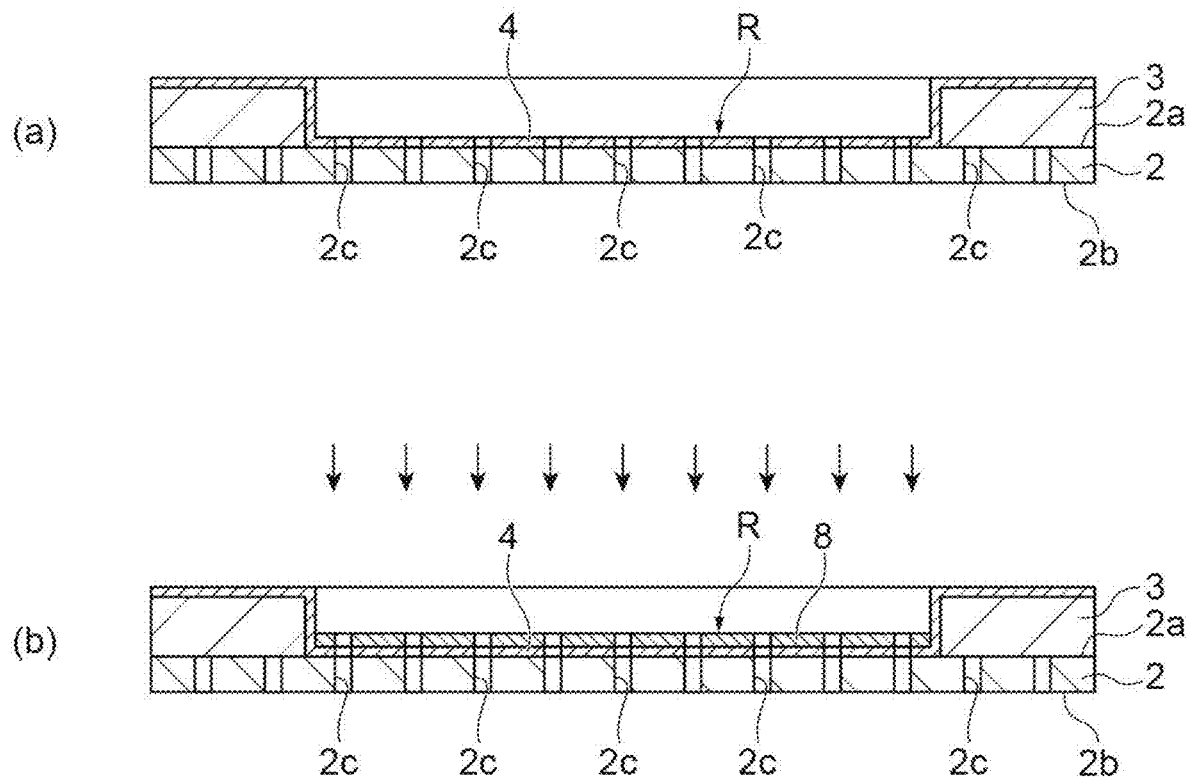
FIG. 5 is a view illustrating a process of a method for manufacturing the sample support body illustrated in FIG. 1.

Next, a method for manufacturing the sample support body 1 will be described. In FIG. 5, the adhesive layer 5 is omitted in illustration from the sample support body 1. Further, the sample support body 1 illustrated in FIGS. 1 and 2 and the sample support body 1 illustrated in FIG. 4 have different dimensional ratios and the like for the convenience of illustration.

First, as illustrated in (a) of FIG. 5, the substrate 2 having the frame 3 and the conductive layer 4 provided on the first surface 2a is prepared. Subsequently, as illustrated in (b) of FIG. 5, the matrix crystal layer 8 is provided on the conductive layer 4 by evaporation of a matrix material. Specifically, for example, by exposing only the conductive layer 4 in the opening 3a of the frame 3 from a mask (not illustrated) and evaporating a matrix material on the exposed conductive layer 4, the matrix crystal layer 8 is formed on the conductive layer 4 provided on the first surface 2a of the substrate 2 in the opening 3a of the frame 3. In the process illustrated in (b) of FIG. 5, the matrix crystal layer is formed with a plurality of matrix crystal grains so as to include a gap communicating the plurality of through-holes 2c with an outside. As the above, the sample support body 1 is obtained. It is noted that the evaporation of a matrix material is performed by, for example, a resistance heating type vacuum evaporation apparatus.

Figure 6:
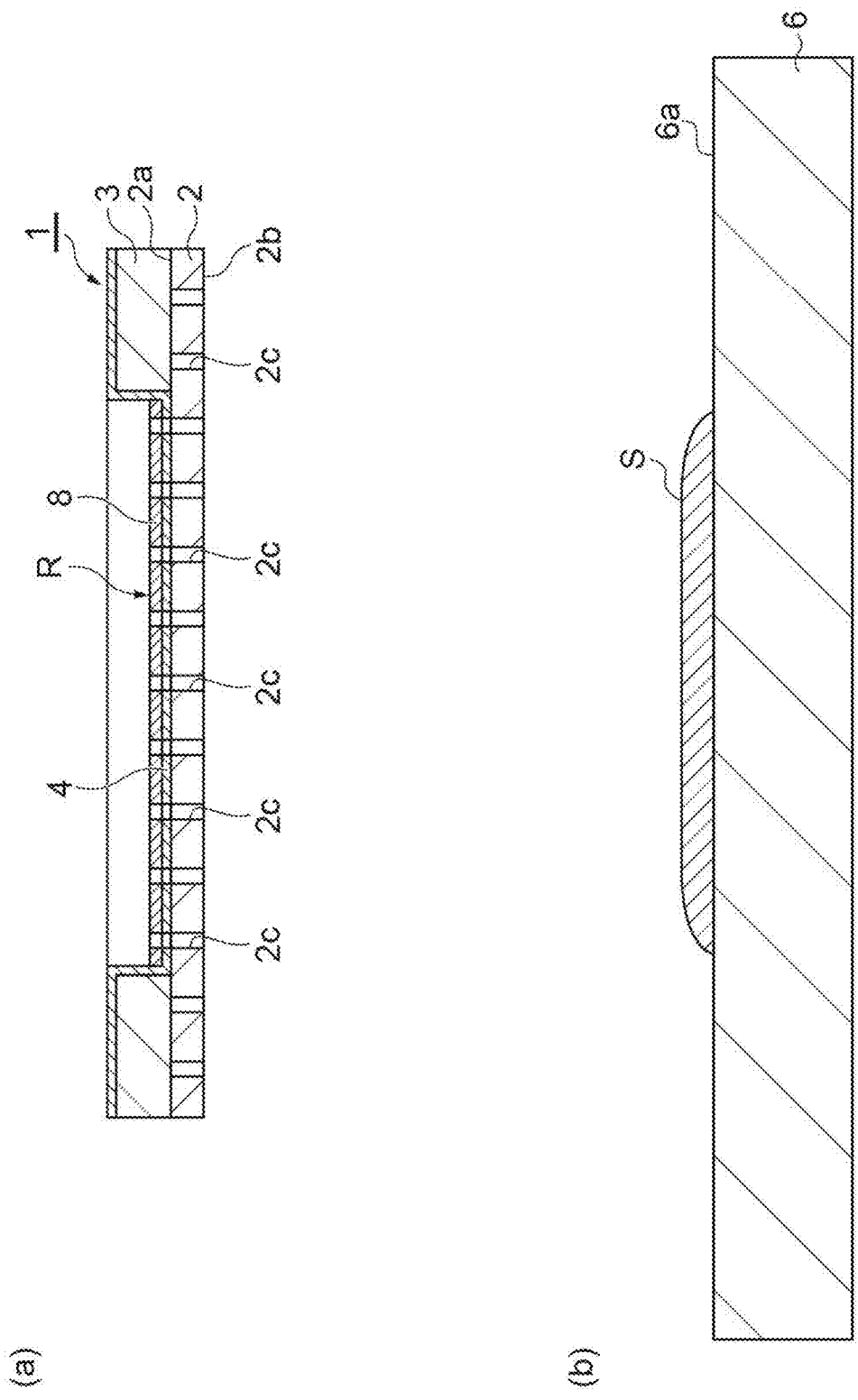
FIG. 6 is a view illustrating a process of a mass spectrometry method using the sample support body illustrated in FIG. 1.
Figure 7:
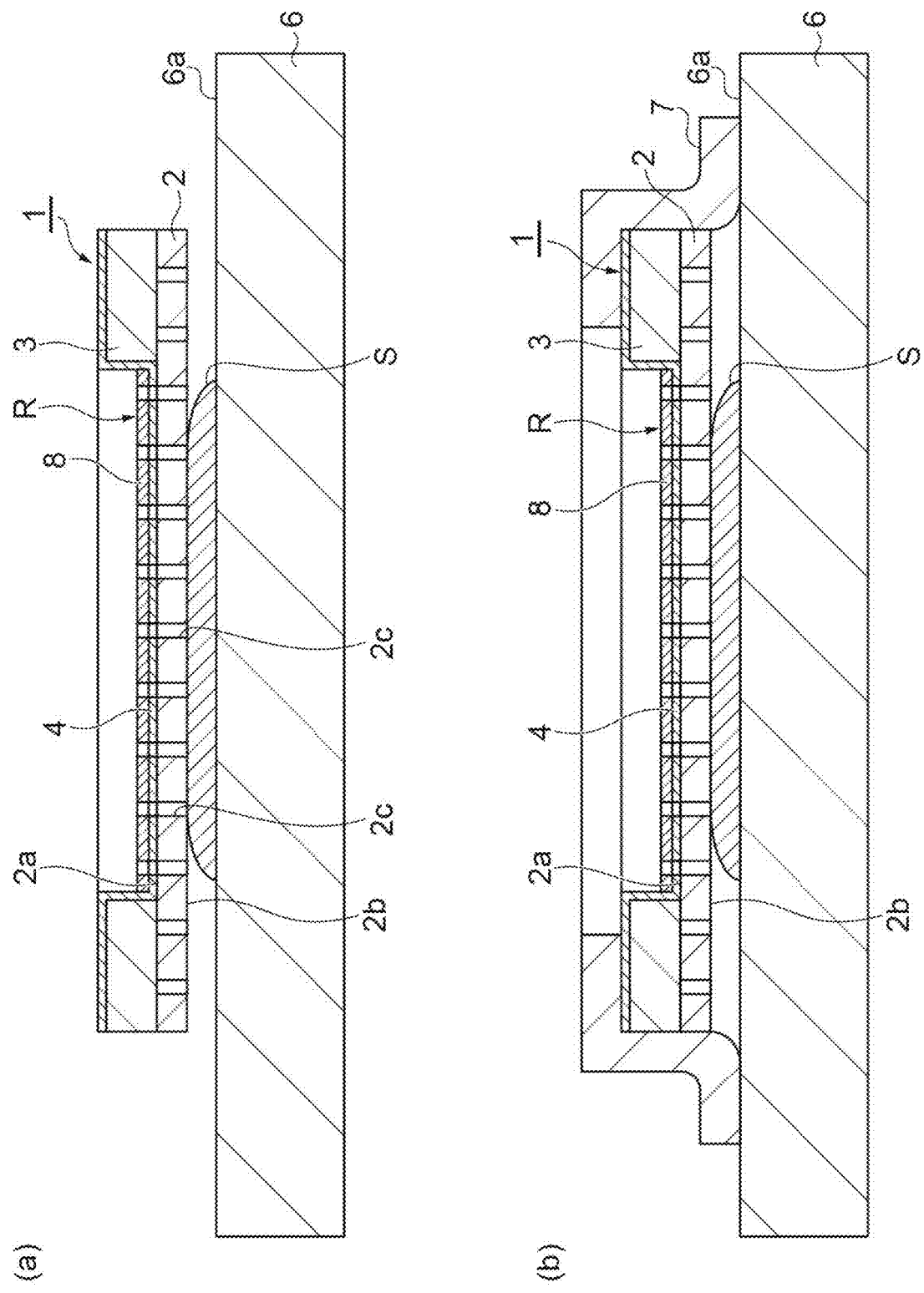
FIG. 7 is a view illustrating a process of the mass spectrometry method using the sample support body illustrated in FIG. 1.
Figure 8:
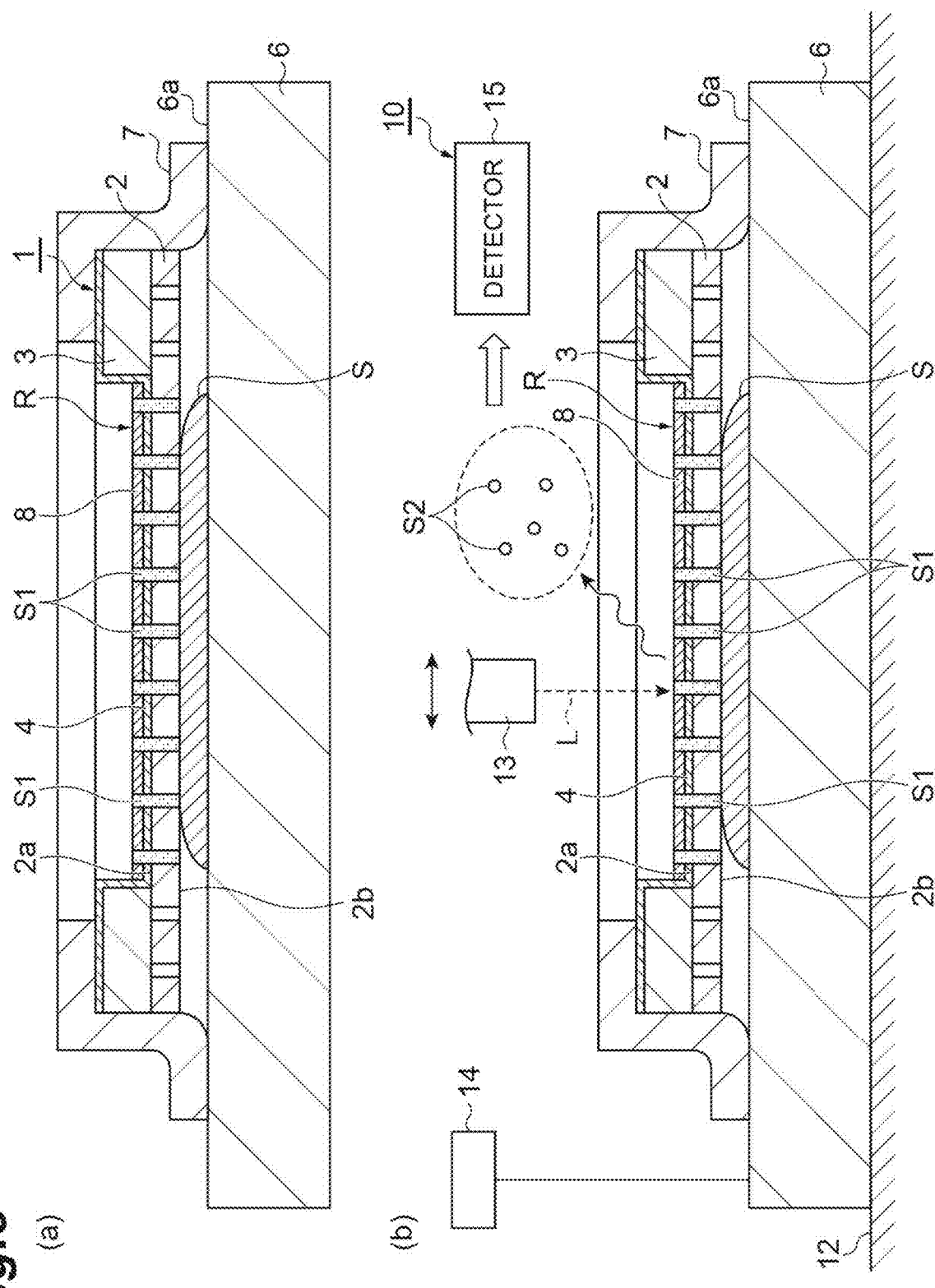
FIG. 8 is a view illustrating a process of the mass spectrometry method using the sample support body illustrated in FIG. 1.

Next, an ionization method and a mass spectrometry method using the sample support body 1 will be described. In FIGS. 6, 7 and 8, in the sample support body 1, the adhesive layer 5 is omitted in illustration. Further, the sample support body 1 illustrated in FIGS. 1 and 2 and the sample support body 1 illustrated in FIGS. 6, 7 and 8 have different dimensional ratios and the like for the convenience of illustration.

First, as illustrated in (a) of FIG. 6, the sample support body 1 is prepared. Subsequently, as illustrated in (b) of FIG. 6, a sample S is arranged on a mount surface 6a of a slide glass (mount portion) 6. The slide glass 6 is a glass substrate on which a transparent conductive film such as an indium tin oxide (ITO) film is formed, and the mount surface 6a is a surface of the transparent conductive film. The sample S is a water-containing sample (for example, a frozen section or the like of a living body). It is noted that, instead of the slide glass 6, a member (for example, a substrate made of a metal material such as stainless steel) capable of ensuring conductivity may be used as the mount portion. Subsequently, as illustrated in (a) of FIG. 7, the sample support body 1 is arranged on the sample S so that the second surface 2b of the substrate 2 is in contact with the sample S. At this time, the sample support body 1 is arranged on the sample S so that the sample S is located in the measurement region R when viewed from the thickness direction of the substrate 2. Subsequently, as illustrated in (b) of FIG. 7, the sample support body 1 is fixed to the slide glass 6 by using a conductive tape 7 (for example, carbon tape or the like).

When the sample support body 1 is arranged on the sample S as described above, as illustrated in (a) of FIG. 8, components S1 of the sample S move to the first surface 2a side via the plurality of through-holes 2c from the second surface 2b side due to the capillary phenomenon and are mixed with the matrix of the matrix crystal layer 8, and the components S1 mixed with the matrix stay on the first surface 2a side of the substrate 2 due to surface tension. At this time, since the matrix crystal layer 8 includes a gap communicating the plurality of through-holes 2c with the outside, the movement of the components S1 of the sample S to the first surface 2a side is not hindered. Subsequently, as illustrated in (b) of FIG. 8, the slide glass 6 on which the sample S and the sample support body 1 are arranged is arranged on a support portion 12 (for example, the stage) of a mass spectrometer 10. Subsequently, a voltage application unit 14 of the mass spectrometer 10 is operated to apply a voltage to the conductive layer 4 of the sample support body 1 via the mount surface 6a of the slide glass 6 and the tape 7, and a laser beam irradiation unit 13 of the mass spectrometer 10 is operated to irradiate the region corresponding to the measurement region R of the first surface 2a of the substrate 2 with a laser beam (energy beam) L. At this time, by operating at least one of the support portion 12 and the laser beam irradiation unit 13, the region corresponding to the measurement region R is scanned with the laser beam L.

When the first surface 2a of the substrate 2 is irradiated with the laser beam L while the voltage is applied to the conductive layer 4 as described above, energy is transferred to the components S1 of the sample S and the matrix that have moved to the first surface 2a side, so that the components S1 of the sample S are ionized together with the matrix, and sample ions S2 (ionized components S1) are discharged. Specifically, when energy is transferred to the components S1 of the sample S and the matrix that have moved to the first surface 2a side, the matrix is vaporized together with the components S1 of the sample S, and protons or cations are added to the molecules of the vaporized components S1, so that the sample ions S2 are generated. The above processes correspond to the ionization method (in this embodiment, a laser desorption/ionization method) using the sample support body 1.

Subsequently, the discharged sample ions S2 are detected by an ion detection unit 15 of the mass spectrometer 10. Specifically, the discharged sample ions S2 move toward a ground electrode (not illustrated) provided between the sample support body 1 and the ion detection unit 15 while accelerating due to a potential difference generated between the conductive layer 4 to which the voltage is applied and the ground electrode and is detected by the ion detection unit 15. Then, the ion detection unit 15 detects the sample ions S2 so as to correspond to the scanning position of the laser beam L, so that the two-dimensional distribution of the molecules constituting the sample S is imaged. The mass spectrometer 10 is a scanning mass spectrometer using time-of-flight mass spectrometry (TOF-MS). The above processes correspond to the mass spectrometry method using the sample support body 1.

It is noted that, in the ionization method and the mass spectrometry method using the sample support body 1, after the process illustrated in (a) of FIG. 8 and before the process illustrated in (b) of FIG. 8, the matrix may be recrystallized by applying a vapor of an organic solvent such as methanol from the first surface 2a side to the measurement region R. Alternatively, after the process illustrated in (a) of FIG. 8 and before the process illustrated in (b) of FIG. 8, a solution containing the matrix material may be applied to the measurement region R using an airbrush, a sprayer, or the like. In either case, the detection sensitivity for the sample ions S2 in the mass spectrometer 10 can be improved.

As described above, in the sample support body 1, when the sample support body 1 is arranged on the sample S so that the second surface 2b of the substrate 2 is in contact with the sample S, since the matrix crystal layers 8 includes a gap communicating the plurality of through-holes 2c with the outside, the components S1 of the sample S move from the second surface 2b side to the first surface 2a side via the plurality of through-holes 2c due to a capillary phenomenon and are mixed with the matrix. In this state, when the first surface 2a is irradiated with the laser beam L while a voltage is applied to the conductive layer 4, the energy is transferred to the components S1 of the sample S and the matrix that have moved to the first surface 2a side, and the components S1 of the sample S are ionized together with the matrix. Accordingly, it is possible to surely ionize the components S1 of the sample S having a high molecular weight. At this time, since the components S1 of the sample S move from the second surface 2b side to the first surface 2a side via the plurality of through-holes 2c, the position information (two-dimensional distribution information of the molecules constituting the sample S) of the sample S is maintained in the components S1 of the sample S that have moved to the first surface 2a side of the substrate 2. In this state, since the first surface 2a is irradiated with the laser beam L while the voltage is applied to the conductive layer 4, the components S1 of the sample S are ionized while the position information of the sample S is maintained. Accordingly, it is possible to improve the resolution of the image in the imaging mass spectrometry. Therefore, the sample support body 1 makes it possible to improve the resolution of the image in the ionization and the imaging mass spectrometry for the components S1 of the sample S having a high molecular weight.

Further, in the sample support body 1, the width of each through-hole 2c is 1 to 700 nm, and the thickness of the substrate 2 is 1 to 50 μm. Accordingly, it is possible to allow the components S1 of the sample S to smoothly move from the second surface 2b side to the first surface 2a side via the plurality of through-holes 2c, and it is possible to allow the components S1 of the sample S to stay on the first surface 2a in an appropriate state.

Further, in the sample support body 1, the substrate 2 is formed by anodizing a valve metal or silicon. Accordingly, it is possible to easily and surely obtain the substrate 2 having the plurality of through-holes 2c.

Further, according to the method for manufacturing the sample support body 1, it is possible to easily and surely obtain the matrix crystal layer 8 as described above by performing the evaporation of a matrix material.

Figure 9:
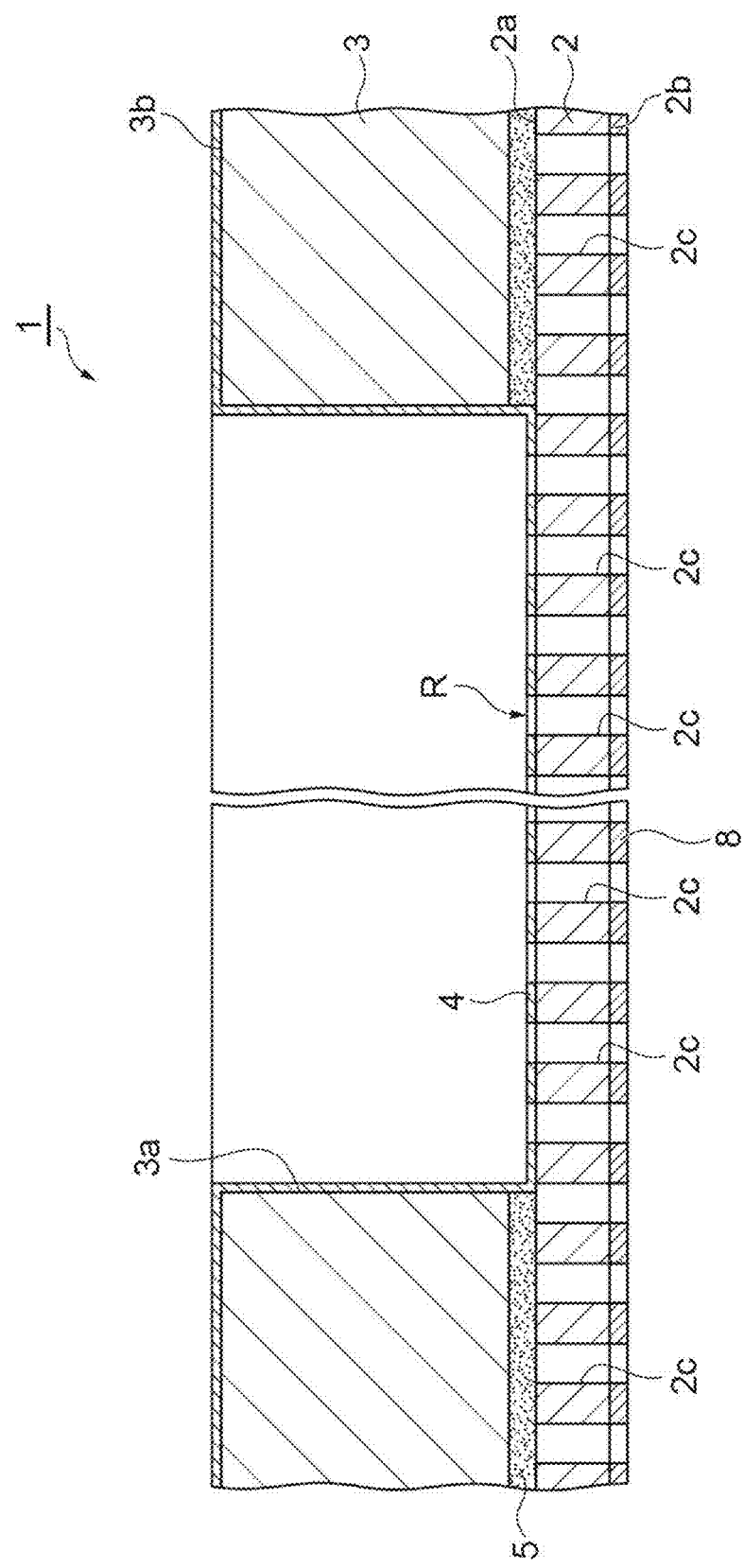
FIG. 9 is a cross-sectional view of a portion of a sample support body of Modified Example.

The present disclosure is not limited to the above embodiments. For example, the conductive layer 4 may be provided at least on the first surface 2a of the substrate 2. That is, as long as the conductive layer 4 is provided on the first surface 2a of the substrate 2, the conductive layer 4 may or may not be provided on the second surface 2b of the substrate 2 and on the inner surface of each through-hole 2c. Further, as illustrated in FIG. 9, the matrix crystal layer 8 may be provided on the second surface 2b of the substrate 2 (on the region corresponding to at least the measurement region R of the second surface 2b of the substrate 2). That is, the matrix crystal layer 8 may be provided on at least one of the conductive layer 4 and the second surface 2b of the substrate 2. Further, the tape 7 may be a portion of the sample support body 1. When the tape 7 is a portion of the sample support body 1 (that is, when the sample support body 1 includes the tape 7), for example, the tape 7 may be preliminarily fixed to the first surface 2a side at the peripheral edge of the substrate 2.

Further, in the sample support body 1, the substrate 2 has conductivity, so that the conductive layer 4 may not be provided on the substrate 2, and the matrix crystal layer 8 may be provided on at least one of the first surface 2a and the second surface 2b of the substrate 2. In such a method for manufacturing the sample support body 1, the conductive substrate 2 may be prepared, and the matrix crystal layer 8 may be provided on at least one of the first surface 2a and the second surface 2b of the substrate 2 by evaporation of a matrix material. Further, in the ionization method and the mass spectrometry method using such a sample support body 1, a voltage may be applied to the substrate 2. According to such a sample support body 1, the conductive layer 4 can be omitted in the sample support body 1, and the same effect as that of the sample support body 1 provided with the conductive layer 4 described above can be obtained.

In addition, the following ionization method and mass spectrometry method may be performed. First, as illustrated in (a) of FIG. 10, the substrate 2 having the frame 3 and the conductive layer 4 provided on the first surface 2a is prepared. Subsequently, the sample S is arranged on the slide glass 6, and the substrate 2 is arranged on the sample S so that the second surface 2b of the substrate 2 is allowed to be contact with the sample S. Subsequently, the matrix crystal layer 8 is provided on the conductive layer 4 by evaporation of a matrix material. At this time, the matrix crystal layer 8 is formed with a plurality of matrix crystal grains so as to include a gap communicating the plurality of through-holes 2c with an outside. Subsequently, as illustrated in (b) of FIG. 10, in a state where the sample S is arranged between the slide glass 6 and the substrate 2, the first surface 2a is irradiated with the laser beam L while a voltage is applied to the conductive layer 4, the components S1 of the sample S that have moved from the second surface 2b side to the first surface 2a side via the plurality of through-holes 2c are ionized together with the matrix, and the sample ions S2 are detected.

According to the ionization method and mass spectrometry method, the matrix crystal layer 8 as described above can be easily and surely obtained by performing the evaporation of a matrix material. Therefore, the ionization method and mass spectrometry method make it possible to improve the resolution of the image in the ionization and the imaging mass spectrometry for the components S1 of the sample S having a high molecular weight. It is noted that, also in the ionization method and the mass spectrometry method, the substrate 2 which has conductivity and in which the conductive layer 4 is not provided on the first surface 2a may be used. In this case, the matrix crystal layer 8 may be provided on the first surface 2a of the substrate 2 by evaporation of a matrix material.

Further, in the above-described ionization method and mass spectrometry method, the sample support body 1 may be fixed to the slide glass 6 by means (for example, means using an adhesive, a fixture, or the like) other than the tape 7. Further, in the above-described ionization method and mass spectrometry method, a voltage may be applied to the conductive layer 4 or the conductive substrate 2 without passing through the mount surface 6a of the slide glass 6 and the tape 7. In this case, the slide glass 6 and the tape 7 may not have conductivity. Further, the sample S may be directly arranged on the support portion 12 of the mass spectrometer 10. In this case, the support portion 12 of the mass spectrometer 10 corresponds to the mount portion.

Further, in the mass spectrometer 10, the laser beam irradiation unit 13 may collectively irradiate the region corresponding to the measurement region R with the laser beam L, and the ion detection unit 15 may detect the sample ions S2 while maintaining the two-dimensional information of the region. That is, the mass spectrometer 10 may be a projection type mass spectrometer. Further, the above-described ionization method can be used not only for the imaging mass spectrometry that forms an image from the two-dimensional distribution of molecules constituting the sample S but also for other measurements and experiments such as ion mobility measurement.

Further, the use of the sample support body 1 is not limited to the ionization of the sample S by irradiation with the laser beam L. The sample support body 1 can be used for ionizing the sample S by irradiation with an energy beam such as a laser beam, an ion beam, or an electron beam. In the above-described ionization method and mass spectrometry method, the sample S can be ionized by irradiation with an energy beam. It is noted that, in that case, an organic compound that absorbs the energy beam used is used as a matrix material.

Further, in the above-described ionization method and mass spectrometry method, the sample S is a water-containing sample (for example, a frozen section or the like of a living body), but the sample S may be a dry sample. That is, the sample support body 1 can be used not only for a water-containing sample but also for a dry sample. When the sample S is a dry sample, an organic solvent may be applied to the measurement region R by using an airbrush, a sprayer, or the like, following the process illustrated in (b) of FIG. 7. Accordingly, the organic solvent reaches the sample S via the gap in the matrix crystal layer 8 and the plurality of through-holes 2c in the substrate 2, and thus, the components S1 of the sample S are moved to the first surface 2a side of the substrate 2, and the components S1 mixed with the matrix can be allowed to stay on the first surface 2a side of the substrate 2. It is noted that, after applying the organic solvent and before the process illustrated in (b) of FIG. 8, a solution containing a matrix material may be applied to the measurement region R using an airbrush, a sprayer, or the like. Accordingly, it is possible to improve the detection sensitivity for the sample ions S2 in the mass spectrometer 10.

Various materials and shapes can be applied to each configuration in the above-described embodiment without being limited to the above-described materials and shapes. In addition, each configuration in one embodiment or Modified Example described above can be arbitrarily applied to each configuration in another embodiment or Modified Example.

REFERENCE SIGNS LIST

1: sample support body, 2: substrate, 2a: first surface, 2b: second surface, 2c: through-hole, 4: conductive layer, 6: slide glass (mount portion), 8: matrix crystal layer, L: laser beam (energy beam), S: sample, S1: component.

The invention claimed is:

1. A sample support body for ionization of a sample, comprising:
   a substrate having a first surface, a second surface on a side opposite to the first surface, and a plurality of through-holes opening on each of the first surface and the second surface;
   a conductive layer provided on the first surface; and
   a matrix crystal layer provided on at least one of the conductive layer and the second surface,
   wherein the matrix crystal layer is formed of a plurality of matrix crystal grains so as to include a gap communicating the plurality of through-holes with an outside.

2. The sample support body according to claim 1,
   wherein a width of each of the plurality of through-holes is 1 to 700 nm, and
   wherein a thickness of the substrate is 1 to 50 µm.

3. The sample support body according to claim 1, wherein the substrate is formed by anodizing a valve metal or silicon.

4. A sample support body for ionization of a sample, comprising:
   a conductive substrate having a first surface, a second surface on a side opposite to the first surface, and a plurality of through-holes opening on each of the first surface and the second surface; and
   a matrix crystal layer provided on at least one of the first surface and the second surface,
   wherein the matrix crystal layer is formed with a plurality of matrix crystal grains so as to include a gap communicating the plurality of through-holes with an outside.

5. A method for manufacturing a sample support body for ionization of a sample, comprising:
   a process of preparing a substrate having a first surface, a second surface on a side opposite to the first surface, and a plurality of through-holes opening on each of the first surface and the second surface and being provided with a conductive layer on the first surface; and
   a process of providing a matrix crystal layer on at least one of the conductive layer and the second surface by evaporation of a matrix material,
   wherein, in the process of providing the matrix crystal layer, the matrix crystal layer is formed with a plurality of matrix crystal grains so as to include a gap communicating the plurality of through-holes with an outside.

6. A method for manufacturing a sample support body for ionization of a sample, comprising:
   a process of preparing a conductive substrate having a first surface, a second surface on a side opposite to the first surface, and a plurality of through-holes opening on each of the first surface and the second surface; and
   a process of providing a matrix crystal layer on at least one of the first surface and the second surface by evaporation of a matrix material,
   wherein, in the process of providing the matrix crystal layer, the matrix crystal layer is formed with a plurality of matrix crystal grains so as to include a gap communicating the plurality of through-holes with an outside.

7. An ionization method, comprising:
   a process of preparing a substrate having a first surface, a second surface on a side opposite to the first surface, and a plurality of through-holes opening on each of the first surface and the second surface and being provided with a conductive layer on the first surface;

a process of arranging a sample on a mount portion and arranging the substrate on the sample so that the second surface is in contact with the sample;

a process of providing a matrix crystal layer on the conductive layer by evaporation of a matrix material; and a process of ionizing components of the sample having moved from the second surface side to the first surface side via the plurality of through-holes together with the matrix by irradiating the first surface with an energy beam while applying a voltage to the conductive layer in a state where the sample is arranged between the mount portion and the substrate, wherein, in the process of providing the matrix crystal layer, the matrix crystal layer is formed with a plurality of matrix crystal grains so as to include a gap communicating the plurality of through-holes with an outside.

8. An ionization method, comprising:

a process of preparing a conductive substrate having a first surface, a second surface on a side opposite to the first surface, and a plurality of through-holes opening on each of the first surface and the second surface;

a process of arranging a sample on a mount portion and arranging the substrate on the sample so that the second surface is in contact with the sample;

a process of providing a matrix crystal layer on the first surface by evaporation of a matrix material; and a process of ionizing components of the sample having moved from the second surface side to the first surface side via the plurality of through-holes together with the matrix by irradiating the first surface with an energy beam while applying a voltage to the substrate in a state where the sample is arranged between the mount portion and the substrate, wherein, in the process of providing the matrix crystal layer, the matrix crystal layer is formed with a plurality of matrix crystal grains so as to include a gap communicating the plurality of through-holes with an outside.

9. A mass spectrometry method comprising:

the processes provided by the ionization method according to claim 7; and a process of detecting the ionized components.

10. A mass spectrometry method comprising:

the processes provided by the ionization method according to claim 8; and a process of detecting the ionized components.

* * * * *